3,538,077
D-GLUCOFURANOSIDE ETHER-ESTERS
Alberto Rossi, Oberwil, Basel-Land, Switzerland, assignor to Ciba Corporation, Summit, N.J., a corporation of Delaware
No Drawing. Filed Sept. 4, 1968, Ser. No. 757,500
Claims priority, application Switzerland, Sept. 26, 1967, 13,419/67; Apr. 25, 1968, 6,162/68
Int. Cl. C07c 47/18
U.S. Cl. 260—210                          9 Claims

ABSTRACT OF THE DISCLOSURE

The invention concerns D-glucofuranosides of formula

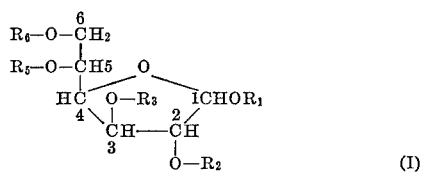

wherein $R_1$ represents a lower alkyl residue, $R_2$ represents hydrogen or the acyl residue of an organic carboxylic acid, one of the groups $R_3$, $R_5$ and $R_6$ represents a benzyl residue which is substituted in the phenyl ring by a halogen atom or a lower alkyl group, and each of the others represents a benzyl residue which is optionally substituted in the phenyl ring, having antiinflammatory properties.

SUMMARY OF THE INVENTION

The present invention concerns D-glucofuranosides of the above Formula I, in which $R_1$, $R_2$, $R_3$, $R_5$ and $R_6$ have the meaning given above, as well as salts of such compounds having a salt-forming group. These compounds are useful as antiphlogistics.

DESCRIPTION OF THE PREFERRED EMBODIMENTS

The above-mentioned compounds have the configuration of D-glucofuranose. The etherified hydroxyl group in 1-position may have the α- or the β-configuration, and the compounds of this invention may be in the form of pure anomers or of mixtures of anomers.

An acyl radical $R_2$ of an organic carboxylic acid is preferably the residue of an aliphatic, aromatic or araliphatic carboxylic acid, such as a lower alkanecarboxylic or lower alkenecarboxylic acid, for example, acetic or propionic acid, or especially a lower alkanedicarboxylic acid containing, for example, 2 to 7, preferably 3 to 6, carbon atoms, or of an equivalent lower alkenedicarboxylic acid containing, for example, 4 to 7 carbon atoms, such acids, are, for example, malonic, 2-methylsuccinic, glutaric, 3-methylglutaric, 3-ethylglutaric, adipic or pimelic acid, in the first place succinic acid, as well as maleic or fumaric acid.

A benzyl radical $R_3$, $R_5$ or $R_6$ optionally substituted in the phenyl nucleus, may contain as substituents, for example, lower alkyl groups and/or etherified or esterified hydroxyl groups, such as lower alkoxy or lower alkylenedioxy groups and/or halogen atoms, as well as "pseudohalogen" groups, such as trifluoromethyl groups.

The residues, radicals or compounds designated above and hereinafter as "lower," contain primarily up to 7, preferably up to 4 carbon atoms.

Lower alkyl radicals are, for example, methyl, ethyl, n-propyl, isopropyl, n-butyl, isobutyl, secondary butyl, tertiary butyl, n-pentyl, isopentyl, neopentyl, n-hexyl, isohexyl, n-heptyl or isoheptyl radicals. Lower alkoxy groups are, for example, methoxy, ethoxy, n-propoxy, isopropoxy, n-butoxy, isobutoxy, n-pentoxy or n-hexoxy groups, and lower alkylenedioxy groups in the first place methylenedioxy groups, whereas halogen atoms are especially those having an atomic weight from 19 to 80, i.e. fluorine, chlorine or bromine atoms. Benzyl radicals may contain in the phenyl nucleus one, or two or more identical or different substituents; benzyl radicals monosubstituted in the nucleus contain such substituent preferably in the para-position.

The new compounds possess valuable pharmacological properties. Thus, in addition to a spasmolytic activity, they have especially an anti-inflammatory effect, as can be shown in animal tests, for example, in the terpentine pleuritis test (performed in analogy to the test described by Spector, J. Path. Bact., vol. 72, p. 367 [1956]), for example, on the rat in doses of about 0.03 g./kg. to about 0.5 g./kg. intraperitoneally. The new compounds are, therefore, primarily useful as antiinflammatory, particularly as antiexudative or antiedematonns agents. The new compounds are also valuable intermediates for the manufacture of other useful substances, especially of pharmacologically active compounds.

Particularly valuable anti-inflammatory properties are found in the D-glucofuranosides of the formula

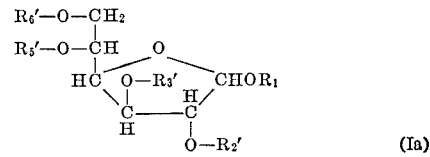

in which $R_1$ has the above meaning, $R_2'$ represents a hydrogen atom or the acyl radical of a lower alkanedicarboxylic acid, especially the succinyl radical, one of the groups $R_3'$, $R_5'$ or $R_6'$ represents a benzyl radical the phenyl nucleus of which is substituted by a halogen, especially a chlorine atom or by a lower alkyl, especially a methyl group, the substituent of the phenyl nucleus being preferentially in the para-position, and each of the other two groups represents a benzyl radical, the phenyl nucleus of which is optionally substituted by a lower alkyl, especially methyl, a lower alkoxy, especially methoxy, or a trifluoromethyl group, or by a halogen, especially chlorine atom, a substituent in the phenyl nucleus of a benzyl radical being preferably located in the para-position, and also the salts, especially non-toxic salts, such as non-toxic ammonium, alkali metal or alkaline earth metal salts of compounds, in which $R_2'$ represents the acyl radical of a lower alkanedicarboxylic acid, especially a succinyl radical.

Preferred D-glucofuranosides are those of the above Formula Ia, in which $R_1$ and $R_2'$ have the above meanings, and two of the groups $R_3'$, $R_5'$ and $R_6'$, preferably the radicals $R_5'$ and $R_6'$, represent benzyl radicals the phenyl neucleus of which are substituted by a halogen, especially chlorine atom or by a lower alkyl, especially methl group, and the third group stands for a benzyl radical the phenyl nucleus of which is optionally substituted by a lower alkyl, especially methly, lower alkoxy, especially methoxy or trifluoromethyl group or by a halogen, especially chlorine atom, a substituent in the phenyl nucleus of a benzyl radical being preferably located in the para-position, as well as salts, such as non-toxic salts, such as non-toxic ammonium, alkali metal or alkaline earth metal salts of compounds, in which $R_2'$ represents the acyl radical of a lower alkanedicarboxylic acid, especially the succinyl radical.

Especially pronounced pharmacological effects as indicated above are found in lower alkyl-3-O-benzyl-5,6-di-O-R-D-glucofuranosides, in which R represents a benzyl radical the phenyl nucleus of which is substituted by a halogen, especially chorine atom or by a lower alkyl, especially methyl, group, preferably in the para-position of the phenyl nucleus, and their 2-O-succinyl derivatives and salts of the latter, for example, those of the kind indicated above, and more especially ethyl-3-O-benzyl-5,6-di-O-(4-methylbenzyl)-D-glucofuranoside and the ethyl-3-O-benzyl-5,6-di-O-(4-chlorobenzyl) - D - glucofuranoside, and their 2-O-succinyl derivatives and salts of the latter, especially those of the kind mentioned above; when these compounds are administered intraperitoneally to rats in a dose of 0.03 to 0.3 g./kg., they produce a pronounced anti-inflammatory effect.

The compounds of this invention are manufactured in a known manner, for example, by reacting a D-glucofuranose of the formula

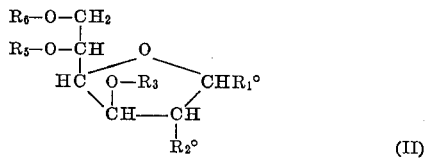

in which $R_1°$ represents a free hydroxyl group and $R_2°$ a free hydroxyl group or an acyloxy radical, in which the acyl radical is the radical of an organic carboxylic acid, or in which the groups $R_1°$ and $R_2°$ together stand for the grouping —O—X—O—, where X represents an nunsubstituted or substituted methylene group, with a compound of the formula $R_1$—OH in the presence of an acid, and, if desired, converting in a resulting compound an acyloxy group in 2-position into a free hydroxyl group and/or, if desired, converting in a resulting compound a free hyroxyl group in 2-position into a hydroxyl group esterified by an organic carboxylic acid.

The acyl residue of an organic acid is, for example, the residue of one of the acids mentioned above.

A group X in the starting material of the Formula II represents an unsubstituted or monosubstituted or preferably disubstituted methylene group. Substituents are in the first place unsubstituted or substituted monovalent or divalent aliphatic hydrocarbon radicals, preferably lower alkyl, for example, ethyl, n-propyl, isopropyl or n-butyl or especially methyl groups, or lower alkylene radicals containing 4 to 6 chain carbon atoms, such as 1,4-butylene or 1,5-pentylene radicals. These hydrocarbon radicals may be substituted, for example, by lower alkyl, hydroxyl or lower alkoxy groups or by halogen atoms, or by aromatic groups, such as phenyl radicals which themselves may contain, for example, lower alkyl, hydroxyl or lower alkoxy groups or halogen atoms as substituents. Further suitable substituents of the methylene group X are, for example, aromatic radicals which may be substituted as indicated above, such as phenyl groups, or free or functionally modified, such as esterified carboxyl groups, for example, carbo-lower alkoxy, such as carbomethoxy or carbethoxy groups.

An acid (Lewis acid) used in the reaction is more especially an inorganic acid, such as a mineral acid, preferably hydrochloric, hydrobromic or sulfuric acid, or an organic acid, such as an organic sulfonic acid, e.g. p-toluene-sulfonic acid, or a mixture of acids, for example, a mixture of hydrochloric and glacial acetic acid.

The reaction of a starting material of the Formula II, in which $R_1°$ represents a free hydroxyl group and $R_2°$ a free or acylated hydroxyl group, with an alcohol of the formula $R_1$—OH is preferably carried out at a mineral acid concentration of about 0.05 N to about 1 N, primarily from about 0.1 N to about 0.5 N.

The above reaction is preferably conducted in the presence of a diluent. Among others, the alcoholic reagent of the formula $R_1$—OH may, if desired, simultaneously serve as diluent; if desired a mixture of solvents or diluents may also be used.

The compounds of the present invention are also obtained, when in a D-glucofuranoside of the above Formula II, in which $R_1°$ represents a reactive esterified hydroxyl group and $R_2°$ an acyloxy radical, acyl being the acyl radical of an organic carboxylic acid, the residue $R_1°$ is replaced by the radical $OR_1$ and, if desired, the optional steps are carried out.

A reactive esterified hydroxyl group is in the first place a hydroxyl group esterified with a hydrohalic acid; $R_1°$, therefore, represents primarily a halogen, especially bromine atom.

The replacement of a reactive esterified hydroxyl group $R_1°$ is preferably performed by treating the starting material with a compound of the formula $R_1$—OH in the presence of an acid acceptor, for example, a silver, lead or mercury salt or a corresponding oxide, or a tertiary base, primarily however metal derivatives of compounds of the formula $R_1$—OH, such as the corresponding alkali metal, for example, sodium or potassium compounds, or alkaline earth metal, for example, magnesium compounds, or the silver compounds.

The above reaction is preferably carried out in the presence of a solvent, for which purpose the alcoholic reagent may, if desired, also be used.

The compounds of this invention are also obtained, when a D-glucofuranoside of the formula

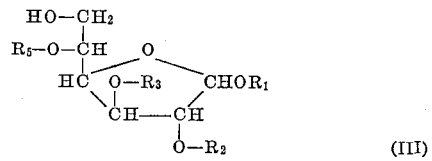

is reacted with a reactive ester of a compound of the formula $R_6$—OH and, if desired, the optional steps are carried out.

In starting materials of the Formula III, a free hydroxyl group in 6-position may be etherified in known manner without much affecting a free hydroxyl group in 2-position, for example, by treatment with about an equivalent amount of a reactive ester of an alcohol of the formula $R_6$—OH in the presence of a suitable basic reagent. A reactive ester is more especially a corresponding halide, for example, chloride or bromide, but it may also be the corresponding ester with a strong organic sulfonic acid, such as p-toluenesulfonic acid. Suitable basic reagents are, for example, alkali metal or alkaline earth metal hydroxides, such as sodium or potassium hydroxide, which are preferably used in equivalent proportions, or alkali metal or alkaline earth metal carbonates, for example, sodium or potassium carbonate, or silver oxide. The reaction is preferably performed in the presence of a solvent, for example, dioxan or dimethylsulfoxide.

In a compound obtained by the above process, in which $R_2$ represents an acyl radical, such radical may be replaced by hydrogen, for example, by treatment with an alkaline reagent, such as an alkali metal or alkaline earth metal hydroxide or carbonate, or with silver oxide, in an aqueous or alcoholic medium.

In compounds in which $R_2$ represents a hydrogen atom, the free hydroxyl group may be esterified by treatment with an acylating agent capable of introducing the acyl radical of an organic carboxylic acid in known manner. Suitable acylating agents are acid derivatives (in the case of dicarboxylic acids, for example, their mono-acid derivatives), especially anhydrides (including inner anhydrides, such as corresponding ketenes), or halides, especially chlorides. In a preferred modification. the reaction is performed with an anhydride, for example, succinic anhydride, in the presence of an acid catalyst or basic condensing agent. The reaction with a carboxylic acid halide, for example, a chloride, such as succinic acid mono-chloride, may be carried out in the presence of an acid-accepting condensing agent, such as a tertiary base or sodium acetate. A free hydroxyl group may also be esterified with the aid of a carboxylic acid in the presence of a suitable condensing agent, such as dicyclohexylcarbodiimide, or with a reactive ester of a carboxylic acid, such as an ester with N-hydroxyamino or N-hydroxyimino compounds, such as N-hydroxysuccinimide.

Compounds having an acyl radical $R_2$ which contains salt-forming groups, for example, free carboxyl groups, may be obtained, depending on the reaction condition employed, in free form or in form of their salts, which forms may be converted one into the other in known manner. Salts of compounds containing a free carboxyl group are, for example, metal salts, especially alkali metal, such as sodium or potassium, salts, or alkaline earth metal, for example, magnesium or calcium, salts, or ammonium salts, for example, salts with ammonia or an organic base, for example, a tri-lower alkylamine, such as trimethylamine or triethylamine, especially non-toxic salts of the kind referred to above. Such salts, especially the alkali metal salts, of the new compounds are distinguished by their good solubility in water; salts may also be used for purifying the free compounds. Salts are obtained, for example, by treatment of the free compounds with metal hydroxides or carbonates or with ammonia or amines, or with suitable ion exchange resins.

In view of the close relationship between the new compounds in free form and in form of their salts, what has been said above and hereinafter with reference to the free compounds or the salts concerns also the corresponding salts and free compounds, respectively, whenever possible and suitable.

The new compounds may be obtained as pure anomers or as anomer mixtures. The latter can be resolved into the two pure anomers on the basis of the physico-chemical differences between the constituents, for example, by chromatographic separation, e.g. thin layer chromatography or by any other suitable separation procedure. Preferably the more active anomer is isolated.

The processes described above are performed in the known manner, in the absence or preferably presence of diluents or solvents, when necessary with cooling or heating, under increased pressure and/or in the atmosphere of an inert gas, such as nitrogen.

The invention includes also any modification of the process in which an intermediate obtained at any stage is used as starting material and any remaining step/steps is/are carried out with it, or the process is terminated at any stage, or in which a starting material is formed under the reaction conditions or used in form of a reactive derivative thereof.

Preferred starting materials are those which furnish the products previously designated as being especially valuable.

The starting materials are known or, insofar as they are new, they may be prepared by known methods. For example, they are obtained by protecting in a D-glucofuranose the hydroxyl groups in 1- and 2-positions, and, if desired, in 5- and 6-positions, by introducing in these positions protective groups, for example, the group X, which is primarily an isopropylidene or benzylidene group. The hydroxyl group in 3-position and, if desired, the hydroxyl group(s) in 5- and/or 6-position(s) may then be etherified by treatment with a reactive ester of a compound of the formula $R_x$—OH, in which $R_x$ represents the residue $R_3$, $R_5$ and/or $R$, for example, with an $R_x$-halide, for example, $R_x$-chloride or $R_x$-bromide, or a corresponding $R_x$-sulfonyloxy compound in the presence of a basic agent, such as an alkali metal hydroxide, for example, sodium or potassium hydroxide, or of an alkali metal carbonate, for example, sodium or potassium carbonate. The etherification with a reactive ester of a compound of the formula $R_3$—OH may be performed under suitable conditions, for example, in the presence of silver oxide or of an alkali metal carbonate, for example, potassium carbonate, also on the 3,5,6-trihydroxy compound without the hydroxy groups in 5- and 6-positions being etherified at the same time.

Protected hydroxyl groups in the 5- and 6-positions in a resulting intermediate may, if desired, be selectively liberated, that is to say without liberating hydroxyl groups in 1- and 2-positions, for example, by treatment with an acid, such as 60% aqueous hydrochloric acid, for example, at 35° C., or aqueous ethanolic hydrochloric acid, whereupon they may themselves be etherified by an optionally substituted benzyl group, for example, with the use of reactive esterified, optionally substituted benzyl alcohols, such as the corresponding halides, for example, chlorides or bromides, and sulfonyloxy, for example, p-toluenesulfonyloxy compounds, in the presence of a basic reagent, such as an alkali metal hydroxide, for example, potassium hydroxide. If desired, this reaction may be performed stepwise, since the primary hydroxyl group in 6-position can be etherified before the one in 5-position, for example, on treatment with an approximately equivalent amount of a reactive ester of the compound of the formula $R_6$—OH in the presence of an approximately equivalent quantity of an alkali metal hydroxide or in the presence of silver oxide.

In a 5,6-dihydroxy compound containing in 3-position a correspondingly etherified hydroxyl group, the hydroxyl group in 6-position may, if desired, be selectively esterified, for example, by treatment with a suitable organic acid sulfonyl halide, such as p-toluenesulfonyl chloride, in the presence of a base, such as pyridine, whereupon the 5,6-epoxy compound may be formed by treatment with a suitable basic reagent, such as an alkali metal-lower alkoxide, e.g. sodium ethoxide; when the epoxide is split by means of an alcohol of the formula $R_6$—OH in the presence of a transesterifying catalyst, for example, an alkali metal, such as sodium, compound of an alcohol of the formula $R_6$—OH, the 5-hydroxy-6-$R_6$-O-compound is obtained. In the latter, the free hydroxyl group in 5-position can be etherified, for example, by treatment with a reactive ester of a compound of the formula $R_5$—OH in the presence of a basic agent, for example, as described above.

In the starting materials obtained by the process described above the protective group for the two hydroxyl groups in 1- and 2-positions can be eliminated, for example, by treatment with an aqueous acid, such as hydrochloric acid. The two hydroxyl groups may then be esterified by reaction with a suitable derivative of an organic carboxylic acid, such as acetic acid, for example, with an anhydride thereof, e.g. acetic anhydride, to form a 1,2-bis-O-acyl-compound, especially a 1,2-bis-O-acetyl-compound; treatment with, for example, bromine in glacial acetic acid furnishes as a suitable starting material a 2-O-acyl, e.g. 2-O-acetyl compound, containing a reactive esterified hydroxyl group, e.g. a bromine atom, in 1-position.

A D-glucofuranoside of the Formula III is obtained, for example, when the free hydroxyl group in 6-position of a 1,2-acetalized or ketalized 3-O-$R_3$-D-glucofuranoside is given temporary selective protection, for example, by introducing the trityl group (e.g. by treatment with tritylchloride in the presence of pyridine) or esterification with an organic sulfonic acid, the hydroxyl group in 5-position is etherified by treatment with a reactive ester of an alcohol of the formula $R_5$—OH in the presence of a basic reagent, such as silver oxide, whereupon the hydroxyl group in 6-position is liberated, either together with the hydroxyl groups in 1- and 2-positions, for example, by treatment with an acid, such as hydrochloric acid, or selectively, for example, by a short treatment with a suitable acid. The resulting product furnishes the desired starting material in the usual manner by glucosidation, for example, by treatment with an alcohol that supplies the radical $R_1$ in the presence of hydrochloric acid.

The new compounds or salts may be used as medicaments, for example, in form of pharmaceutical preparations containing them in conjunction or admixture with an organic or inorganic, solid or liquid excipient suitable, for example, for enteral, parenteral or topical administration. Suitable excipients are substances that are inert towards the new compounds, such as water, gelatin, sugars, for example, lactose, glucose or fructose, starches such as corn, wheat or rice starch, stearic acid or stearates such as calcium or magnesium stearate, talcum, vegetable oils, benzyl alcohols, gums, polyalkyleneglycols, propyleneglycol or other known medicinal excipients. The pharmaceutical preparations may be, for example, tablets, dragees or capsules, or in liquid form solutions, suspensions or emulsions. They may be sterilized and/or contain auxiliary such as preserving, stabilizing, wetting or emulsifying agents, salts for regulating the osmotic pressure or buffers. They may also contain further therapeutically valuable substances. The preparations are formulated by known methods.

The following examples illustrate the invention; temperatures are given in degrees centigrade.

EXAMPLE 1

A solution of 70.3 g. of 1,2-O-isopropylidene-3,5,6-tri-O-(4-chlorobenzyl)-α-D-glucofuranose in 1400 ml. of 1 N ethanolic solution of hydrogen chloride is kept for 16 hours at room temperature. The reacton mixture is then cooled to 0–5° and neutralized with a 10 N aqueous sodium hydroxide solution. The bulk of ethanol is distilled off under reduced pressuer at 40° and the residue is extracted with chloroform. The chloroform solution is washed with an aqueous sodium bisulfite solution and with water, dried over sodium sulfate and evaporated under reduced pressure. The residue solidifies on standing; it represents the ethyl-3,5,6-tri-O-(4-chlorobenzyl)-D-glucofuranoside of the formula

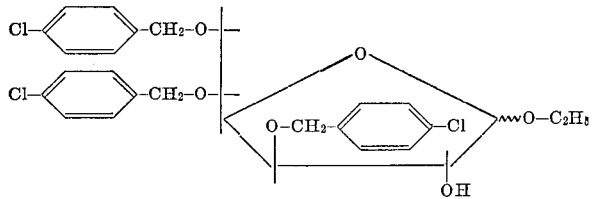

$[\alpha]_D^{20} = -56° \pm 1°$ (c.=1 in chloroform).

The mixture of anomers can be resolved into the pure anomers by preparative thin-layer chromatography on silica gel (RF 254 of Messrs. Merck, Darmstadt) in the system chloroform and ethyl acetate (85:15). Pure α-anomer can be enriched by fractional crystallization from a mixture of ether and petroleum ether (boiling range 50–70°). The α-anomer has an $R_f$ value of 0.58; M.P. 48–49.5°; $[\alpha]_D^{20} = -7° \pm 1°$ (c.=1 in chloroform); the β-anomer an $R_f$ value of 0.30; M.P. 68–70°;

$[\alpha]_D^{20} = -74° + 1°$ (c.=1 in chloroform)

The starting material may be prepared as follows:

A solution of 44 g. of 1,2-O-isopropylidene-α-D-glucofuranose in 150 ml. of absolute dioxan is mixed with 140 g. of powdered potassium hydroxide. The mixture is heated to 80–90°, then 322 g. of 4-chlorobenzyl chloride are added dropwise within 1 hour and the reaction is allowed to proceed for an additional 8 hours, after which the excess 4-chlorobenzyl chloride is distilled off with steam. After cooling, the reaction mixture is extracted with chloroform; the chloroform solution is washed with water, dried over sodium sulfate and evaporated under reduced pressure. The residue is dissolved in benzene and filtered through a column of aluminum oxide (basic; activity I). The eluate is evaporated under reduced pressure and furnishes the pure 1,2-O-isopropylidene-3,5,6-tri-O-(4-chlorobenzyl)-α-D-glucofuranose as a thickly liquid oil.

EXAMPLE 2

A solution of 21.2 g. of 1,2 - O - isopropylidene-3-O-benzyl-5,6-di - O - (4-chlorobenzyl)α-D-glucofuranose in 530 ml. of a 1 N ethanolic solution of hydrogen chloride is kept for 16 hours at room temperature, cooled to 0–5° and neutralized with a 10 N aqueous sodium hydroxide solution; the excess ethanol is distilled off under reduced pressure at 40° and the residue is extracted with chloroform. The chloroform solution is washed with an aqueous sodium bisulfite solution and with water, dried over sodium sulfate and evaporated under reduced pressure. The residue is degassed in a high vacuum at room temperature, to yield the ethyl - 3 - O - benzyl-5,6-di-O-(4-chlorobenzyl)-D-glucofuranoside of the formula

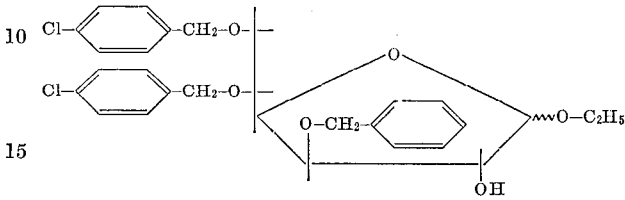

as a faintly yellowish, thickly liquid oil;

$[\alpha]_D^{20} = -26° \pm 1°$ (c.=1 in chloroform).

The mixture of anomers is resolved into the pure anomers by eluation with an 85:15-mixture of chloroform and ethyl acetate by thin-layer chromatography on silica gel (RF 254, of Messrs. Merck, Darmstadt). The α-anomer shows an $R_f$ value of 0.63; $[\alpha]_D^{20} = +17° \pm 1°$ (c.=1 in chloroform); the β-anomer an $R_f$ value of 0.25;

$[\alpha]_D^{20} = -55° \pm 1°$ (c.=1 in chloroform).

The starting material may be prepared as follows:

A solution of 15.5 g. of 1,2-O-isopropylidene-3-O-benzyl-α-D-glucofuranose in 50 ml. of absolute dioxan is mixed with 34 g. of powdered potassium hydroxide. Then 48 g. of 4-chlorobenzyl chloride are added dropwise within 30 minutes while stirring and the reaction is allowed to proceed for an additional 5 hours, then the excess 4-chlorobenzyl chloride is distilled off with steam. After cooling, the residue is extracted with chloroform and the chloroform solution is washed with water, dried over sodium sulfate and evaporated under reduced pressure. The residue is dissolved in benzene and filtered through a column of aluminum oxide (basic; activity I). The eluate is evaporated under reduced pressure and yields the pure 1,2-O-isopropylidene-3-O-benzyl-5,6-di-O - (4 - chlorobenzyl)-α-D-glucofuranose as a faintly yellowish, thick oil ($R_f$ value=0.68; thin-layer plate RF 254 of Messrs. Merck, Darmstadt; system: 85:15-mixture of chloroform and ethyl acetate).

EXAMPLE 3

A solution of 11.25 g. of 1,2-O-isopropylidene-3-O-benzyl - 5,6 - di-O-(4-methylbenzyl)-α-D-glucofuranose in 300 ml. of a 1 N ethanolic solution of hydrogen chloride is kept for 20 hours at room temperature, cooled to 0–5° and neutralized with a 10 N aqueous sodium hydroxide solution; the bulk of ethanol is then distilled off under reduced pressure. The residue is extracted with chloroform, and the chloroform solutions is washed with an aqueous sodium bisulfite solution and with water, dried over sodium sulfate and evaporated under reduced pressure. The residue is degassed in a high vacuum; it consists of the substantially pure ethyl-3-O-benzyl-5,6-di-O-(4-methylbenzyl)-D-gulcofuranoside of the formula

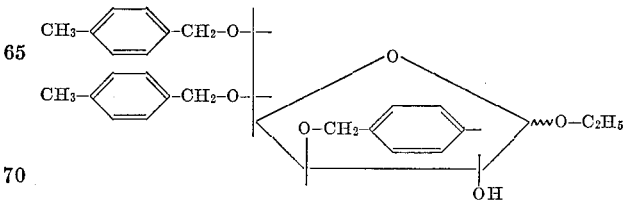

in form of a faintly yellowish oil; $[\alpha]_D^{20} = -30 \pm 1°$ (c.=1 in chloroform).

The starting material may be prepared as follows:

In the course of one hour, 34 g. of powdered potassium hydroxide is added portionwise while stirring to a solution of 15.5 g. of 1,2-O-isopropylidene-3-O-benzyl-α-D-gulcofuranose and 42 g. of 4-methylbenzyl chloride in 50 ml. of absolute dioxan. The reaction mixture is then heated for 3 hours at 70–80°, and the excess 4-methylbenzyl chloride is distilled off under reduced pressure. The mixture is allowed to cool and is then extracted with chloroform. The chloroform solution is washed with water, dried over sodium sulfate and evaporated under reduced pressure. The residue is dissolved in benzene and filtered through a column of aluminum oxide (basic; activity I). The eluate is evaporated and yields the pure 1,2 - O-isopropylidene-3-O-benzyl-5,6-di-O-(4-methylbenzyl)-α-D-glucofuranose as a yellowish, thick oil with an $R_f$ value of 0.63 (thin-layer plate, RF 254 of Messrs. Merck, Darmstadt; system: 85:15-mixture of chloroform and ethyl acetate).

EXAMPLE 4

A solution of 28 g. of 1,2-O-isopropylidene-3,5-di-O-(4 - chlorobenzyl) - 6-O-benzyl-α-D-glucofuranose in 750 ml. of a 1 N ethanolic solution of hydrogen chloride is kept for 20 hours at room temperature, then cooled to 0–5° and neutralized with a 10 N aqueous sodium hydroxide solution. The bulk of ethanol is distilled off under reduced pressure and the residue is extracted with chloroform; the chloroform layer is washed with an aqueous sodium bisulfite solution and with water, dried over sodium sulfate and evaporated under reduced pressure. The residue is freed from residual solvent at room temperature in a high vacuum, and yields the pure ethyl-3,5-di-O-(4-chlorobenzyl)-6-O-benzyl-D-glucofuranoside of the formula

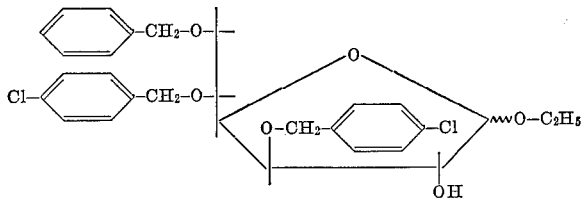

as a yellow solid substances; $[\alpha]_D^{20}=-52°\pm1°$ (c.=1 in chloroform).

The mixture of anomers can be resolved into the pure anomers by preparative thin-layer chromatography on silica gel (RF 254 of Messrs. Merck, Darmstadt) in the system chloroform and ethyl acetate (85:15). By fractional crystallization from ether, pure β-anomer is enriched. α-Anomer has an $R_f$ value of 0.6;

$$[\alpha]_D^{20}=-3°\pm1°$$

(c.=1 in chloroform); and the β-anomer an $R_f$ value of 0.3; M.P. 83–84°; $[\alpha]_D^{20}=-81°\pm1°$ (c.=1 in chloroform).

The starting material may be prepared as follows:

The mixture of anomers can be resolved into the pure anomers by preparative thin-layer chromatography on silica gel (RF 254 of Messrs. Merck, Darmstadt) in the system chloroform and ethyl acetate (85:15). By fractional crystallization from ether, pure β-anomer is enriched. α-Anomer has an $R_f$ value of 0.6;

$$[\alpha]_D^{20}=-3°\pm1°$$

(c.=1 in chloroform); and the β-anomer an $R_f$ value of 0.3; M.P. 83–84°; $[\alpha]_D^{20}=-81°\pm1°$ (c.=1 in chloroform).

The starting material may be prepared as follows:

In the course of one hour 21 g. of powdered potassium hydroxide are added while stirring to a solution of 17.7 g. of 1,2-O-isopropylidene-6-O-benzyl-α-D-glucofuranose 55 g. of 4-chlorobenzyl chloride in 90 ml. of absolute dioxan at 80–90°. The reaction is allowed to proceed for another 8 hours at 80–90°, then another 10 g. of powdered potassium hydroxide, and, within one hour, 12 g. of 4-chlorobenzyl chloride are added. The mixture is heated for one hour at 80–90° and the excess 4-chlorobenzyl chloride is then distilled off with steam. The cooled reaction mixture is extracted with chloroform, and the chloroform solution is dried over sodium sulfate and evaporated under reduced pressure. After evaporation of the residual solvent in a high vacuum, the 1,2-O-isopropylidene-3,5-di-O-(4-chlorobenzyl)-6-O-benzyl - α - D-glucofuranose is obtained; $[\alpha]_D^{20}=-58°\pm1°$ (c.=1 in chloroform).

EXAMPLE 5

A solution of 23 g. of 1,2-O-isopropylidene-3-O-(4-chlorobenzyl)-5,6-O-benzyl-α-D-glucofuranose in 600 ml. of a 1 N isobutanolic solution of dry hydrogen chloride gas is kept for 22 hours at room temperature, then cooled to 0–5° and neutralized with a 10 N aqueous sodium hydroxide solution; the organic phase is separated and washed with a small quantity of water. The bulk of the isobutanol is distilled off under reduced pressure in a rotary evaporator and the residue is extracted with chloroform. The organic extract is washed with an aqueous sodium bisulfite solution and with water, dried over sodium sulfate and evaporated under reduced pressure. The residue is degassed at 130°/0.05 mm. Hg. The desired isobutyl-3-O-(4-chlorobenzyl)-5,6-O-benzyl-D-glucofuranoside of the formula.

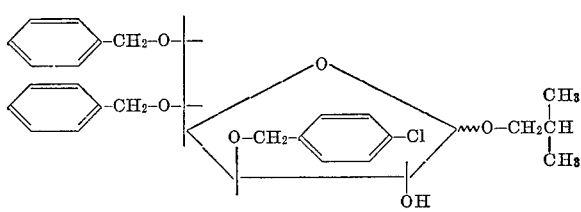

is obtained as a thick oil; $[\alpha]_D^{20}=-50°\pm1°$ (c.=1 in chloroform).

The starting material used above may be prepared as follows:

A solution of 520 g. of 1,2;5,6-di-O-isopropylidene-α-D-glucofuranose in 2500 ml. of absolute dioxan is mixed with 1610 g. of 4-chlorobenzyl chloride. A total of 620 g. of powdered potassium hydroxide is added in 4 portions within 1 hour at 50° while vigorously stirring. The reaction mixture is kept for 2 hours at 80–90°, the excess 4-chlorobenzyl chloride is distilled off with steam and, after cooling, the residue is extracted with chloroform. The organic solution is dried over sodium sulfate and evaporated under reduced pressure. The residue yields on distillation the 1,2;5,6-di-O-isopropylidene-3-O-(4-chlorobenzyl)-α-D-glucofuranose as a faintly yellowish oil, B.P. 150–152°/0.15 mm. Hg; $[\alpha]_D^{20}=-27°\pm1°$ (c.=1 in chloroform.).

A solution of 614 g. of 1,2;5,6-di-O-isopropylidene-3-O-(4-chlorobenzyl)-α-D-glucofuranose in 1685 ml. of glacial acetic acid and 945 ml. of water is stirred for 6 hours at an internal temperature of 35°, concentrated under reduced pressure to about one half of the volume and neutralized in the cold with a 10 N aqueous sodium hydroxide solution and then extracted with chloroform. The organic extract is washed with water, dried over sodium sulfate and evaporated under reduced pressure. The residue is degassed in a high vacuum at 60° until its weight remains constant.

A solution of the resulting crude 1,2-O-isopropylidene-3-O-(4-chlorobenzyl)-α-D-glucofuranose in 200 ml. of absolute dioxan is mixed with 70.3 g. of powdered potassium hydroxide and, while being stirred for 30 minutes, treated with 132 g. of benzyl chloride. The reaction mixture is heated for 5 hours at 80°, the excess benzyl chloride is distilled off with steam and after cooling the residue is extracted with chloroform. The organic extract is washed with water, dried over sodium sulfate and evaporated under reduced pressure. The residue is degassed for 4 hours at 100° in a high vacuum and yields the crude 1,2-O-isopropylidene-3-O-(4-chlorobenzyl) - 5,6-di-O-benzyl- α-D-glucofuranose; $[\alpha]_D^{20} = -45° \pm 1°$ (c.=1 in chloroform); which can be purified by distillation (B.P. 250–260°/0.01 mm. Hg) in a molecular distillation apparatus.

EXAMPLE 6

A total of 5 ml. of a 33% solution of hydrogen bromide in glacial acetic acid is added to 2.3 g. of 1,2-di-O-acetyl-3-O-(4-chlorobenzyl) - 5,6-di-O-benzyl-D-glucofuranose while cooling with ice and the mixture is kept for 2½ hours at room temperature, then poured over ice-water and extracted with chloroform. The organic extract is washed with ice water and an ice-cold aqueous sodium bicarbonate solution, dried over sodium sulfate and evaporated under vacuum at a bath temperature of 30–40°.

The residue, which contains the 2-O-acetyl-3-O-(4-chlorobenzyl)-5,6-di-O-benzyl-D-glucofuranosyl bromide, is mixed with 50 ml. of a 1 N isobutanolic solution of sodium isobutanolate and kept for 16 hours at room temperature, then neutralized with 2 N aqueous acetic acid and extracted with chloroform. The organic extract is washed with ice-water and an ice-cold concentrated aqueous sodium bicarbonate solution, dried over sodium sulfate and evaporated under a water-jet vacuum. The residue represents the isobutyl-3-O-(4-chlorobenzyl)-5,6-di-O-benzyl-D-glucofuranoside in form of a thick oil;

$$[\alpha]_D^{20} = -50° \pm 1°$$

(c.=1 in chloroform).

The starting material may be prepared as follows:

A suspension of 9.8 g. of 1,2-O-isopropylidene-3-O-(4-chlorobenzyl)-5,6-di-O-benzyl-α-D-glucofuranose in a mixture of 70 ml. of glacial acetic acid and 35 ml. of 1 N aqueous sulfuric acid is heated for 30 minutes at an internal temperature of 80° while being vigorously stirred under a nitrogen atmosphere. The reaction mixture is cooled to 10°, adjusted to a pH value of 2–3 with a 2 N aqueous sodium hydroxide solution and then evaporated at a bath temperature of 35°. The concentrate is extracted with ether, and the organic phase is washed with water, dried over sodium sulfate and evaporated. The residue represents the 3-O-(4-chlorobenzyl)-5,6-di-O-benzyl-D-glucofuranose, which can be crystallized from a mixture of ether and petroleum ether and melts at 76–79°;

$$[\alpha]_D^{20} = -39° \pm 1°$$

(c.=1 in chloroform).

The 3-O-(4-chlorobenzyl)-5,6-di-O-benzyl-D-glucofuranose is also obtained, when 15 g. of isobutyl-3-O-(4-chlorobenzyl)-5,6-di-O-benzyl-D-glucofuranoside is treated with 600 ml. of glacial acetic acid and 600 ml. of water, the mixture is heated for 16 hours at 70°, the excess acetic acid distilled off, the aqueous residue extracted and the ether solution is worked up as described above.

A solution of 12 g. of 3-O-(4-chlorobenzyl)-5,6-di-O-benzyl-D-glucofuranose in 12 ml. of absolute pyridine is cooled, mixed with 12 ml. of acetic anhydride and kept for 16 hours at room temperature, and then diluted with 12 ml. of water while cooling, and decanted to separate the aqueous layer from the precipitated oil. The latter is taken up in ether; the organic phase is extracted by agitation with 2 N hydrochloric acid and washed with water, dried over magnesium sulfate and evaporated. The resulting - 1,2-di-O-acetyl-3-O-(4-chlorobenzyl)-5,6-di-O benzyl-D-glucofuranose can be used without purification.

EXAMPLE 7

A solution of 2 g. of 3-O-(4-chlorobenzyl)-5,6-di-O-benzyl-D-glucofuranose in 25 ml. of absolute isobutanol, containing 0.156 g. of hydrogen chloride gas, is kept for 1 hour at room temperature under a nitrogen atmosphere, then adjusted to a pH value of 7 to 7.5 with 30% aqueous sodium hydroxide solution while being cooled, and filtered. The residue is washed with ethanol and the combined filtrates are concentrated to half the volume at 30° under reduced pressure and then diluted with water. The oily precipitate is separated and degassed in a high vacuum to yield the isobutyl-3-O-(4-chlorobenzyl) - 5,6 - di-O-benzyl-D-glucofuranoside as a thick oil;

$$[\alpha]_D^{20} = -50° \pm 1°$$

(c.=1 in chloroform).

EXAMPLE 8

Capsules containing 0.3 g. of the active substance each may be prepared as follows (for 5000 capsules):

| Ingredients: | G. |
|---|---|
| Ethyl-3-O-benzyl-5,6-di-O-(4 - chlorobenzyl)-D-glucofuranoside | 1500 |
| Ethanol | 150 |

The ethyl-3-O-benzyl-5,6-di-O-(4 - chlorobenzyl) - D-glucofuranoside is mixed with the ethanol and the mixture is filled on a suitable encapsulating machine into soft gelatin capsules.

Instead of the ethyl-3-O-benzyl-5,6-di-O-(4-chlorobenzyl)-D-glucofuranoside one may use in the above manufacture of capsules the ethyl-3-O-benzyl-5,6-di-O-(4-methylbenzyl)-D-glucofuranoside as the active ingredient.

What is claimed is:

1. A member selected from the group consisting of D-glucofuranosides of formula

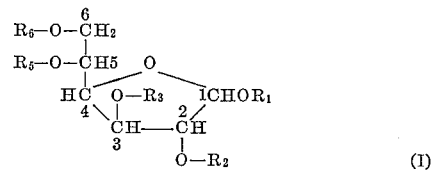

(I)

wherein $R_1$ is lower alkyl, $R_2$ is a member from the group consisting of hydrogen and the acyl residue of a lower alkanedicarboxylic acid, one of the groups $R_3$, $R_5$ and $R_6$ is benzyl substituted by a member selected from the group consisting of halogeno and lower alkyl, and each of the others is a member selected from the group consisting of benzyl, benzyl substituted by lower alkyl, benzyl substituted by lower alkoxy, benzyl substituted by halogeno and benzyl substituted by trifluoromethyl, and the non-toxic salts of such compounds having salt-forming groups.

2. D-glucofuranosides as claimed in claim 1, wherein $R_1$ has the meaning given in claim 1, $R_2$ is a member selected from the group consisting of hydrogen and succinyl, one of the groups $R_3$, $R_5$ and $R_6$ is benzyl substituted by a member selected from the group consisting of chloro and methyl, and each of the others is a member selected from the group consisting of benzyl, benzyl substituted by methyl, benzyl substituted by methoxy, benzyl substituted by trifluoromethyl, and benzyl substituted by chloro.

3. D-glucofuranosides as claimed in claim 1, wherein $R_1$ has the meaning given in claim 1, $R_2$ is a member selected from the group consisting of hydrogen and succinyl, two of the groups $R_3$, $R_5$ and $R_6$ is benzyl substituted by a member selected from the group consisting of halogeno and lower alkyl, and the third is benzyl substituted by a member selected from the group consisting of benzyl, benzyl substituted by lower alkyl, benzyl substituted by lower alkoxy, benzyl substituted by halogeno and benzyl substituted by trifluoromethyl.

4. D-glucofuranosides as claimed in claim 1, wherein $R_1$ has the meaning given in claim 1, $R_2$ is a member selected from the group consisting of hydrogen and succinyl, two of the groups $R_3$, $R_5$ and $R_6$ is benzyl substituted by a member selected from the groups consisting of chloro and methyl, and the third is a member selected from the group consisting of benzyl, benzyl substituted by methyl, benzyl substituted by methoxy, benzyl substituted by trifluoromethyl, and benzyl substituted by chloro.

5. A D-glucofuranoside as claimed in claim 1, wherein $R_1$ is ethyl, $R_2$ is hydrogen, and each of $R_3$, $R_5$ and $R_6$ is 4-chlorobenzyl.

6. A D-glucofuranoside as claimed in claim 1, wherein $R_1$ is ethyl, $R_2$ is hydrogen, $R_3$ is benzyl and each of $R_5$ and $R_6$ is 4-chlorobenzyl.

7. A D-glusofuranoside as claimed in claim 1, wherein $R_1$ is ethyl, $R_2$ is hydrogen, $R_3$ is benzyl and each of $R_5$ and $R_6$ is 4-methylbenzyl.

8. A D-glucofuranoside as claimed in claim 1, wherein $R_1$ is ethyl, $R_2$ is hydrogen, each of $R_3$ and $R_5$ is 4-chlorobenzyl and $R_6$ is benzyl.

9. A D-glucofuranoside as claimed in claim 1, wherein $R_1$ is isobutyl, $R_2$ is hydrogen, $R_3$ is 4-chlorobenzyl and each of $R_5$ and $R_6$ is benzyl.

References Cited

UNITED STATES PATENTS 3,157,634    11/1964    Druey et al. _____ 260—210
3,196,147    7/1965    Kiss _____ 260—210

ELBERT L. ROBERTS, Primary Examiner
J. R. BROWN, Assistant Examiner

U.S. Cl. X.R.

424—180